Jan. 29, 1946.   W. M. ZAIKOWSKY   2,393,674
APPARATUS FOR GAS ANALYSIS
Filed June 26, 1939   3 Sheets-Sheet 3

INVENTOR.
WLADIMIR M. ZAIKOWSKY
BY
Lippincott & Metcalf
ATTORNEYS.

Patented Jan. 29, 1946

2,393,674

UNITED STATES PATENT OFFICE 2,393,674

APPARATUS FOR GAS ANALYSIS

Wladimir M. Zaikowsky, Pasadena, Calif., assignor, by mesne assignments, to Consolidated Engineering Corporation, Pasadena, Calif., a corporation of California Application June 26, 1939, Serial No. 281,128

4 Claims. (Cl. 23—254)

My invention relates to gas analysis and more particularly to a means and method of analyzing a gas in order to determine the presence of certain hydrocarbons therein.

Among the objects of my invention are: to provide a means and method of gas analysis distinguishing hydrocarbons indicative of oil deposits, from hydrocarbons known to have other origins; to provide a means and method of gas analysis which will indicate the presence of ethane or the higher paraffins, even when methane and ethylene are also present; to provide a means and method of gas analysis automatically recording volumetric changes due to combustion; to provide a means and method of distinguishing between methane and ethylene as one group, and the higher paraffins as another group in a gas sample; to provide a means and method of detecting other hydrocarbons in the presence of methane and ethylene; to provide a means and method of distinguishing, in a soil gas sample hydrocarbons indicative of oil deposits, from hydrocarbons which are bacteriological and vegetable by-products; and, to provide a simple direct reading gas analysis device ideally adapted for use when total hydrocarbon concentration is small.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus, of the present application, as I may adopt various other apparatus embodiments, utilizing the method, within the scope of the appended claims.

Figure 1:
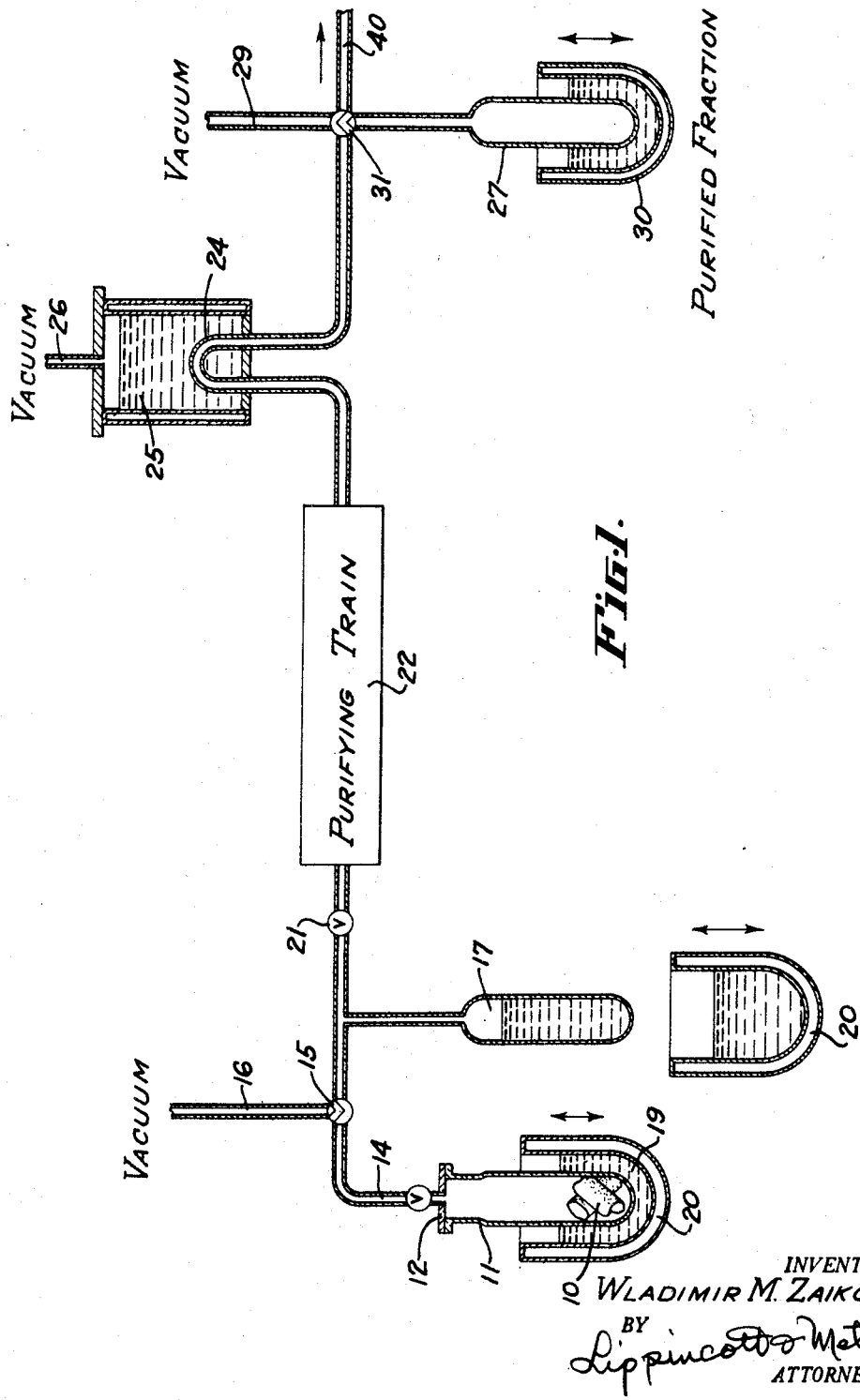
Figure 1 is a diagrammatic representation of one preferred system for obtaining purified soil gas.

Referring directly to Figure 1 a soil or gas sample 10 is collected in the field, preferably below the water table, and placed in a wide mouthed jar 11. A large number of such samples may be collected in the field over an area to be prospected, from systematically located points of which records are kept. Each sample is sealed in its own jar, labeled, and brought into the laboratory or field truck to be attached to the analyzing system. This system comprises a fitting 12 to which the mouth of jar 11 may be secured, fitting 12 being the end of a gas line 14. Gas line 14 connects through three way stop cock 15 to a vacuum line 16 and to a gas chamber 17. While in many cases container 17 may be empty, and used for the direct accumulation of gas, in many other cases it is desirable to utilize therein adsorption agents such as, for example, activated charcoal or silica gel. The sample 10 when connected to a gas line 14 is first frozen by means of liquid air 19 contained in vacuum bottle 20. Container 11 may then be evacuated to remove air therefrom. Gas chamber 17, isolated from the remainder of the system by main stop cock 21, may also be evacuated. Liquid air trap 20 may then be removed from container 11 and applied to chamber 17. Thereafter various amounts of heat may be applied to sample 10 to cause gas to emanate therefrom which gas is collected in chamber 17. At least a partial fractionation may be made in this manner, as desired, by application of various temperatures to the original sample.

Stop cock 15 may then be utilized to isolate the gas sample in chamber 17 from the original soil, and stop cock 21 be opened to admit gas from container 17 together with an oxygen bearing gas if desired through line 16 into a purifying train 22 wherein, by methods well known in the art, $H_2$ and CO and other undesired impurities are removed. After the gas has passed through purifying train 22, it is passed through an inverted trap 24 surrounded by solid $CO_2$, whose evaporation rate is controlled by a vacuum line 26 in such a manner that the temperature of trap 24 is maintained at approximately —90° to —100° C. This temperature will remove water vapor from the gas sample without condensing any substantial amount of such hydrocarbon gas present as I desire to indicate. The purified gas thus obtained is collected in purified gas container 27 which has previously been evacuated by vacuum line 29, container 27 being provided with a liquid air envelope 30. Thus various purified fractions from the original soil sample may be collected in container 27 if desired at any pressure desired.

The purified fraction in container 27 may then be isolated from the purifying train by stop cock 31 and allowed to pass into combustion chamber 32 through line 40 and stopcock 41.

Figure 3:
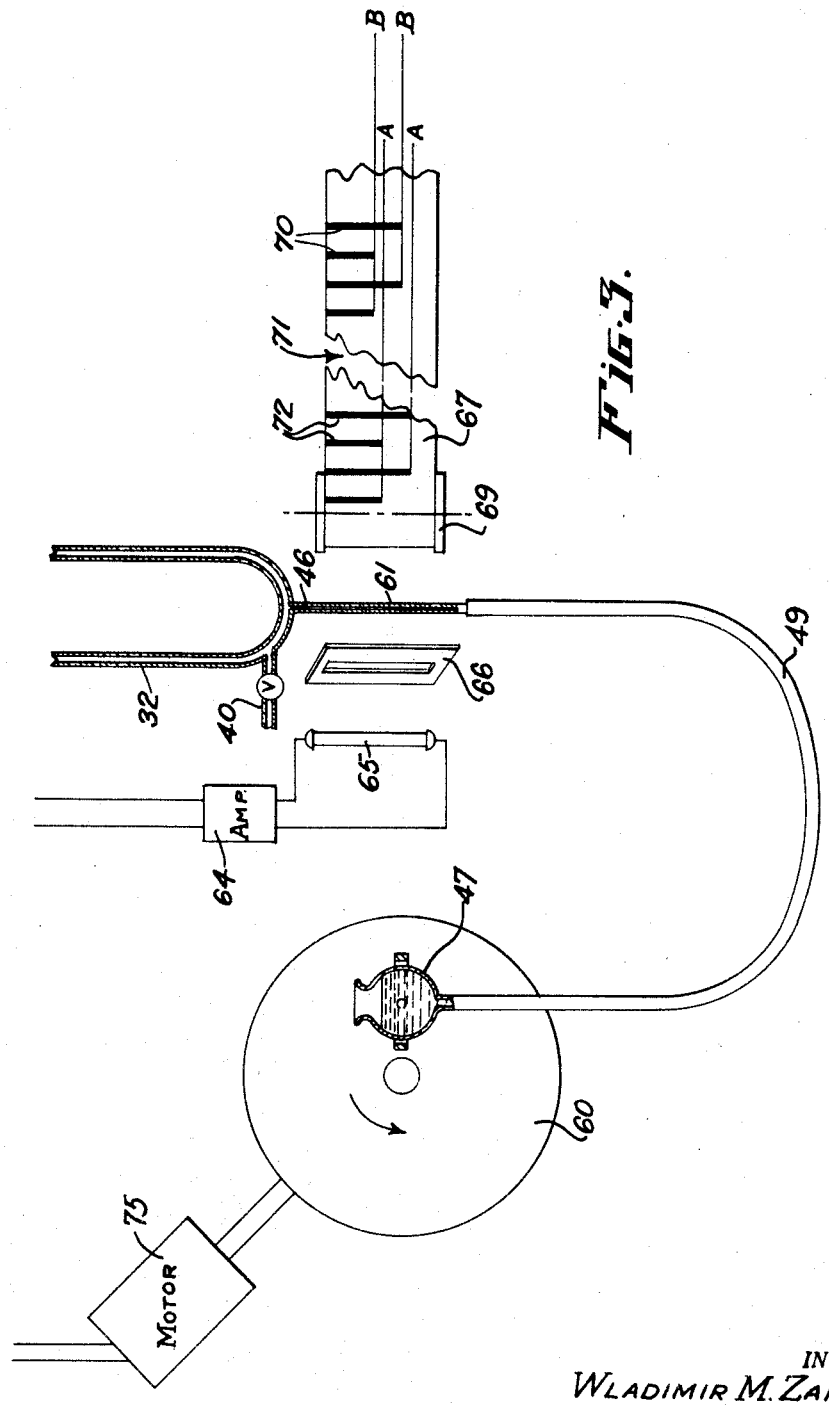
Figure 3 is a diagrammatic representation of an automatic recording device applicable to the system shown in Figure 2.

Combustion chamber 32 is a tube roughly describing an oval, and is provided on one leg of the oval with a cooling chamber 34. On the other leg of the chamber is a coil 35 mounted in an expanded portion 36. This coil is preferably made of platinum wire wound in tapered helical form and without exterior connections. The helix is preferably heated from outside of the combustion chamber by an infra red lamp 37 or by induction if preferred. The base of helix 35 overlies and surrounds a jet 39. Combustion chamber 32 is also provided at one end thereof between cooling chamber 34 and helix 35 with a portion 44 sealed by an unstable diaphragm 45, otherwise known as a click diaphragm, in that changes in pressure on one side thereof will cause distortion into a new position with an audible click, this distortion reversing when the pressure is reversed a predetermined amount, with the same sound. The opposite end of the combustion chamber is provided with a capillary tube 46 filled with a mercury column to a defined level from a mercury container 47 connected with capillary tube 46 by flexible tube 49, as shown in Figure 3. The remaining details of the mercury column will be described later.

Figure 2:
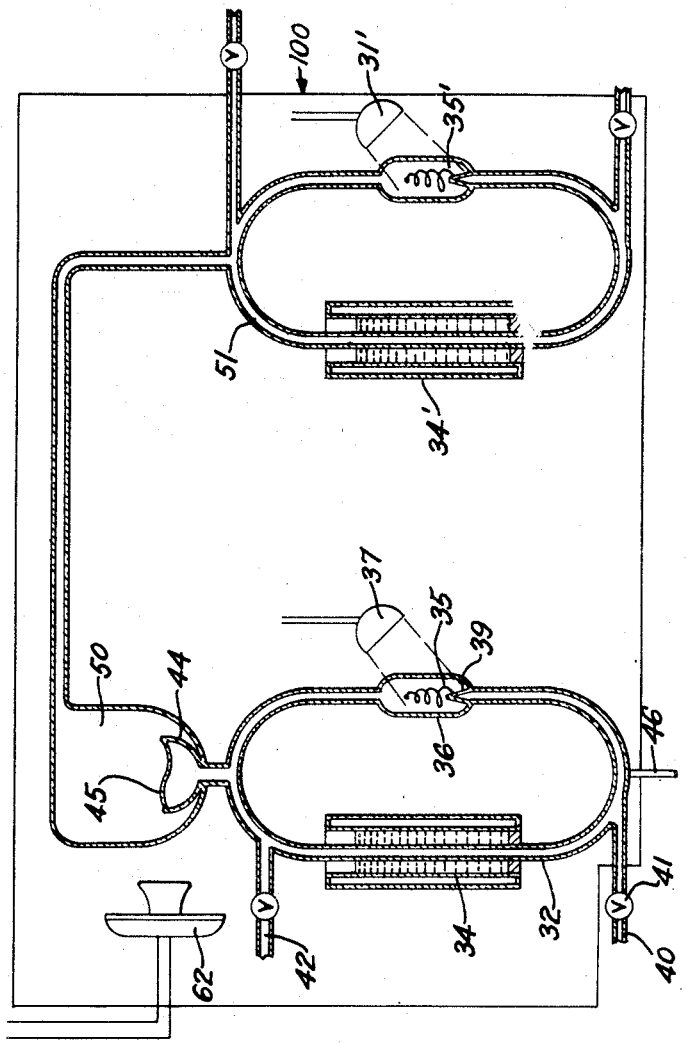
Figure 2 is a diagram forming a continuation of the diagram of Figure 1, showing the means by which I obtain volumetric changes in accordance with the gas present.

Returning to Figure 2, diaphragm 45 is positioned within a chamber 50 connected to a check chamber 51 which is an exact duplicate of combustion chamber 32 except for the fact that there is no capillary tube attached thereto and contains helix 35' and provided with cooling chamber 34'.

Referring to Figure 3 for additional details of the mercury column controlling device, mercury container 47 is mounted on wheel 60 rotated by motor 75 at a relatively slow and uniform speed. The radial distance of mercury container 47 from the center of rotation, is such as to periodically raise and lower mercury column 61 in capillary tube 46 a sufficient amount to cause diaphragm 45 to click into both upper and lower positions acting through the gas in the combustion chamber. In as much as I prefer to continuously record the upper and lower positions of the mercury column at each diaphragm clicking time I position, adjacent diaphragm 45, a pickup microphone 62 energizing an amplifier 64 whose output energizes a mercury arc tube 65 at each click. This tube passes light through a slit 66 on to film 67, this film being continuously and uniformly progressed by driving sprocket 69. Mercury column 61, however, is positioned between slit 66 and film 67 and moves parallel thereto and obscures a portion of the slit. In as much as light 65 will only be energized when the click occurs, ends B—B of recorded lines 70 on film 67 will show the positions of the mercury column at the times the clicks occur, before combustion. All of the apparatus shown in Figures 2 and 3 should preferably be enclosed in a temperature controlled container 100 (see Fig. 2) to eliminate effects of temperature distribution and to maintain the water of combustion in vapor phase during measurement.

It is clear that thermo syphon circulation in each of the chambers 32 and 51 will start as soon as platinum coils 35 and 35' are heated even if coolers 34 and 34' are not used, in which case the maintenance of both chambers at the same temperature will be facilitated by any suitable means.

Assume now that the gas sample to be analyzed has been admitted to combustion chamber 32 through stop cock 41 and that check chamber 51 has also been filled with gas, such as for example, air at a pressure balancing the unstable diaphragm 45 in a position enabling pressure changes caused by movement of the mercury column to click the diaphragm at the upper and lower limits of its movement. The infra red lamp 37 of the combustion chamber and lamp 37' of the check chamber, are energized to heat platinum spirals 35 and 35'. Circulation of gas around the combustion chamber and around the check chamber will then start due to the differential temperatures in the chambers. This circulating action is due to the combined action of the differential temperatures and gravity and is the type known as thermo-syphon circulation. As spiral 35 increases in temperature, combustion of the hydrocarbon within combustion chamber 32 will take place, utilizing the catalytic action of the platinum wire, and oxygen which has accompanied the gas. No combustion takes place in the check chamber because of the lack of combustible material therein.

During the time of circulation and combustion in the combustion chamber, the clicks of diaphragm 45 may be irregular and this portion of the record is omitted in Figure 3. As soon as combustion is completed however, the clicks will stabilize. As there has not been any change in volume of the gas due to combustion within the check chamber then any change in volume in the combustion chamber will cause a displacement in the clicking positions of the mercury column. This shift in clicking relationship will be registered on the film as shown by lines 70 and 72. Thus an increase in volume due to combustion is indicated by the distance between lines A and B in Figure 3, and this difference indicates that ethane, propane, etc., were present. The important fact is that the presence of methane or ethylene in no way obscures the results obtained.

The following formulas are examples of various oxidation reactions which may occur:

For methane:

$$CH_4 + 2O_2 = CO_2 + 2H_2O$$
$$3 \text{ vols.} = 3 \text{ vols.}$$

For ethylene:

$$C_2H_4 + 3O_2 = 2CO_2 + 2H_2O$$
$$4 \text{ vols.} = 4 \text{ vols.}$$

For ethane:

$$C_2H_6 + 3.5O_2 = 2CO_2 + 3H_2O$$
$$4.5 \text{ vols.} = 5 \text{ vols.}$$

For propane:

$$C_3H_8 + 5O_2 = 3CO_2 + 4H_2O$$
$$6 \text{ vols.} = 7 \text{ vols.}$$

Any change in volume that occurs is a measure of the change in molal quantity or molal volume of the gas.

As has been stated the gas admitted to each chamber is dried sufficiently so as to prevent the condensation of water which will be formed in the combustion of hydrocarbons. The observance of this point is essential and the temperature surrounding both chambers should be so correlated with the amount of water vapors formed in combustion so that no condensation occurs. If a small quantity of water vapor is produced in the combustion chamber 32, the temperature of the chamber wall, even if at room temperature, will be sufficiently high to prevent condensation of the water of combustion. In case sufficient water is produced tending to condense water vapor in the chamber 32, the temperature of a temperature control chamber surrounding the apparatus may be raised to such a degree that the excess water vapor otherwise tending to condense will be maintained in vapor phase.

After a recording has been made, giving the click positions with relation to the mercury column, both before and after combustion, the analyzed sample may be withdrawn through line 42, and a new sample may be admitted to combustion chamber 32 and the cycle repeated.

Thus I am able to take a sample containing or suspected of including ethane in addition to methane and ethylene, and determine whether or not ethane or other hydrocarbons indicative of oil deposits are present, by determining whether or not an increase of volume occurs after combustion. If such an increase occurs then ethane and such other hydrocarbons are present, if no increase in volume occurs then none of the hydrocarbons such as ethane are present in the original sample.

As previously described, in order to assure myself that the reaction and the results obtained will be reliable, I remove, if present, hydrogen and carbon monoxide during purification, as these gases give a reduction in volume, which might counteract any increase in volume created by the presence of ethane, for example.

Thus, I have been able to determine the presence or absence of ethane, propane, etc., in mixtures containing ethylene or methane. It should be pointed out here that this distinction can not be made in such mixtures by routine analysis, without an extremely long and complicated process, which is many times impossible to accomplish because of the small hydrocarbon concentration available in the original soil sample.

Also it will be obvious to those skilled in the art that my described means and method is valuable in determining the presence of ethane, etc., even when no ethylene or methane is present.

I claim:

1. Apparatus for analysis of soil gas for hydrocarbons indicative of petroleum deposits, comprising purifying train means for removing hydrogen and carbon monoxide from the gas to be analyzed, combustion chamber, a valved conduit connecting said means to said combustion chamber for transfer of gas from said means to said combustion chamber, first heating means mounted within said combustion chamber for oxidizing said gas in said combustion chamber, measuring means associated with said combustion chamber adapted to indicate changes in the molal volume of said gas, and second heating means enclosing said combustion chamber for maintaining the water of combustion in vapor phase during such measurement.

2. Apparatus for micro-analysis of gas comprising two similar chambers whose interiors are separated by a pressure-sensitive click-type diaphragm capable of producing sound when it is sufficiently and suddenly deformed, means for introducing and maintaining a gas to be analyzed in the first of the chambers, a first heating means within that chamber for producing combustion of the gas to be analyzed, valved conduits communicating with the interior of the second of the chambers, a second heating means enclosing both chambers for maintaining the two chambers at substantially identical temperatures, a tube leading into the first of the chambers, means for reciprocating a confining liquid within that tube to vary the effective volume of the first chamber and the pressure differential between the two sides of the diaphragm to produce a sudden change in the position of the diaphragm, means associated with the tube capable of periodically recording the positions of the confining liquid in the tube during the reciprocation of this liquid, and means responsive to the sounds of the sudden changes of the diaphragm position and associated with the last-named means for actuating the same to record small changes of volume resulting from the combustion of the gas undergoing analysis.

3. In apparatus for micro-analysis of gas, the combustion which comprises a first chamber having a valved conduit connected thereto for admission of gas and means for effecting combustion of the gas in the chamber, a second closed comparison chamber, a conduit between the chambers closed by a click-type diaphragm, a continuously operable pressure generating means constructed to impart reciprocating pressure impulses to said first chamber, a conduit containing a liquid connected to said first chamber and said pressure generating means as to impart the reciprocating impulses to said fluid, means for measuring and indicating movement of liquid in said conduit, and sound sensitive means responsive to the snapping of said diaphragm arranged to effect the operation of said indicating means.

4. In apparatus for micro-analysis of gas, the combination which comprises a chamber having a valved conduit connected thereto for admission of gas and means for effecting combustion of the gas in the chamber, a click-type diaphragm forming part of the wall of the chamber and movable from one position to another with change of pressure within the chamber, a continuously operable pressure-generating means constructed to impart reciprocating pressure impulses to the chamber, a conduit containing a liquid so connected to the chamber and to the pressure-generating means as to impart the reciprocating impulses to the fluid, means for measuring and indicating movement of liquid in said conduit, and sound sensitive means responsive to the snapping of the diaphragm arranged to effect the operation of said indicating means.

WLADIMIR M. ZAIKOWSKY.